United States Patent [19]

Bieck

[11] Patent Number: 5,692,718
[45] Date of Patent: Dec. 2, 1997

[54] HOLDING DEVICE FOR DRINK CONTAINER

[75] Inventor: Torsten Bieck, Waldachtal, Germany

[73] Assignee: Fischerwerke, Arthur Fischer GmbH & Co., Waldachtal, Germany

[21] Appl. No.: 604,226

[22] Filed: Feb. 22, 1996

[30] Foreign Application Priority Data

Mar. 4, 1995 [DE] Germany .............. 195 07 614.1

[51] Int. Cl.⁶ ............................................. A47F 5/00
[52] U.S. Cl. .................. 248/311.2; 224/281; 224/926; 297/188.17
[58] Field of Search ............... 248/311.2, 310, 248/313; 297/188.15, 188.17; 224/926, 281

[56] References Cited

U.S. PATENT DOCUMENTS

| | | | |
|---|---|---|---|
| 4,738,423 | 4/1988 | DiFilippo et al. | 248/311.2 |
| 4,792,174 | 12/1988 | Shioda | 296/37.12 |
| 4,826,058 | 5/1989 | Nakayama | 224/42.44 |
| 5,259,580 | 11/1993 | Anderson et al. | 248/311.2 |
| 5,297,709 | 3/1994 | Dykstra et al. | 224/281 |
| 5,297,767 | 3/1994 | Miller et al. | 248/311.2 |
| 5,379,978 | 1/1995 | Patel et al. | 248/311.2 |

Primary Examiner—Leslie A. Braun
Assistant Examiner—Charles J. Hunter
Attorney, Agent, or Firm—Michael J. Striker

[57] ABSTRACT

A holding device for drink containers for installation in the fascia of a motor vehicle has a slide member on which a holder is mounted so as to be pivotable upward into a horizontal position and to which a support is linked which is likewise pivotally mounted on the slide member and which, when the holder is pivoted upward, pivots with a setting-down surface beneath an insertion opening in the holder. To fold the holder and the support into a flat position in one plane with the slide member, the return member is pivotally mounted on the slide member, engages with a control cam of the support, and, when the slide member is pushed in, is pressed downwards on a fixed oblique surface and thereby folds up the holder and the support. The control cam extends in such a way that the return member locks the holder in its horizontal position.

10 Claims, 2 Drawing Sheets

HOLDING DEVICE FOR DRINK CONTAINER

BACKGROUND OF THE INVENTION

The present invention relates to a holding device for a drink container, which is provided for installation in the fascia of a motor vehicle or the like.

Various holding devices of this type are known which have slide members, which can be pulled out in a horizontal direction, as drink holders. Such a construction requires a horizontal installation space. From U.S. Pat. No. 5,297,709 a holding device of this type is known in which the slide member is arranged to be pulled out obliquely upwards and pivoted in the extended position into a horizontal position in order to be able to receive drink containers in an upright position. The oblique arrangement of the slide member in the pushed-in basic position makes it possible to fit the holding device in many cases in which there is no space available for horizontal fitting.

This known holding device has the drawback that its slide member has to be pulled out obliquely upward and then pivoted downward into a horizontal holding position. Before the slide member is pushed in, the latter must be pivoted upward again. Pulling out and pushing in cannot be effected automatically. In the extended holding position, a rear end of the slide member bears by way of an angled leaf spring against a recess in a slide guide of the known holding device. The holding position of the slide member is consequently comparatively unstable. On the slide member there is pivotally mounted a support on which rests a drink container inserted into the holding device. The support, as a result of gravity, folds downward as soon as it is liberated as the slide member is pulled out of the slide guide. Neither the slide member nor the support are secured against accidental folding-in when in their holding position. If someone unintentionally knocks against the support or the slide member from below, the latter pivot upwards and a drink container inserted therein falls out and spills its contents.

SUMMARY OF THE INVENTION

Accordingly, it is an object of the present invention to provide a holding device for a drink container for installation in the fascia of a motor vehicle or the like, which avoids the disadvantages of the prior art.

In keeping with these objects and with others which will become apparent hereinafter, one feature of the present invention resides, briefly stated, in a holding device for a drink container with a slide member guided to be displaced in a slide guide extending obliquely to the horizontal from a basic position in which it is pushed in into an extended holding position, wherein in accordance with the present invention the holding device has a holder with an insertion opening for insertion of the drink container and is pivotally mounted on the slide member so that when the slide member is displaced from the basic position into the holding position, it pivots out of an initial position approximately parallel to the slide member into a horizontal position, and a support with a setting-down surface for the drink container is pivotally mounted on the slide member and linked with the holder so that when the holder is pivoted into the horizontal position, the support pivots with the setting-down surface downward beneath the insertion opening of the holder.

When the holding for a drink container is designed in accordance with the present invention, then with a simple displacing movement it can be brought into a holding position and back into a basic position, and holds an inserted drink container in a stable manner and securely in the case of inadvertent contact with the holding device.

The slide member of the holding device according to the invention moves exclusively in translation in the direction of its guide. The slide guide can therefore be constructed so as to be stable. The slide member is not pivoted, and displacement into the holding position and the basic position takes place with a simple movement in a straight line. The slide member stands obliquely in its holding position. Pivotally mounted on it is a holder for the insertion of a drink container, which holder, when the slide member is displaced into the holding position, pivots into a horizontal position in which it holds upright an inserted drink container. Moreover, there is pivotally mounted on the slide member a support which has a setting-down surface. When the slide member is displaced into the holding position, the support pivots in such a way that its setting-down surface moves downward beneath the holder. The holder engages around an inserted drink container which stands on the setting-down surface of the support. The support is linked with the holder, for example by means of a pin engaging in an oblong hole, so that it is forced to pivot downwards with its setting-down surface when the holder pivots into its horizontal position. Owing to the fact that the support pivots downward with the setting-down surface, the setting-down surface reaches a sufficiently large vertical distance from the holder to hold securely, against tipping, a drink container which is inserted into the holding device according to the invention and is surrounded by the holder. In the basic pushed-in position of the slide member, the holder and the support are pivoted flat into each other in one plane with the slide member, so that the holding device according to the invention can be accommodated in an installation space of limited height.

In accordance with a further feature of the invention, a return member is pivotally mounted on the slide member. This engages with the holder either directly or indirectly by way of the support. The return member therefore pivots when the holder is brought into its horizontal position, as the slide member is pulled out into the holding position. The return member has a return surface which, when the slide member is pushed into the basic position, slides along on a fixed complementary surface of the holding device, so that the return member pivots back into its original position and pivots the holder, either directly or indirectly by way of the support, from the horizontal position back into an inclined initial position approximately parallel to the slide member. Together with the holder, the support linked with it also pivots. In this way, the holder, the support and the return member, through the displacement of the slide member into the holding position, together pivot into an opened-out position, and when the slide member is pushed in pivot into a flat, folded-together position.

In accordance with a further feature of the invention, the holder or the support has a control cam in which the return member engages. The control cam is shaped in such a way that the return member locks the holder, and the support linked with it, in the opened-out position when the slide member is pulled out into the holding position. This is achieved by the alignment of an end portion of the control cam in which the return member is situated when the holder or the support is opened out. This end portion extends approximately tangentially to a pivot axis of the return member, so that a pivoting moment acting on the support or the holder produces a force of the return member transversely to the control cam and thereby prevents pivoting of the holder and of the support. Or the end portion extends away from the pivot axis of the return member, so that the return member meets an end stop of the control cam when the support or the holder is pivoted out of the opened-out position, and the support and the holder are thus prevented from folding in. In this embodiment of the invention, the folding-in of the holder and the support engaging with it can therefore be achieved only by action on the return member, which pivots the holder and the support into the folded-in position when the slide member is pushed in. The holder and the support are in this ways secured against folding-in owing to accidental knocking against one of these two parts.

In one embodiment of the invention, the pivoting of the holder into its horizontal position and of the support with its setting-down surface in a downward direction is effected by means of a spring element engaging with the holder and/or a spring element engaging with the return member.

In one embodiment of the invention, the slide member is pushed out into its holding position by a spring. In its basic position, the slide member is held by a locking means. In this embodiment, the holding device according to the invention, after unlocking of the slide member, moves by itself into the holding position, in which a drink container can be inserted into. The slide member need not therefore be pulled out manually.

In a further development, the spring is a scroll spring. This is a leaf spring which, owing to its elasticity, rolls up from one end into a roll by itself. The scroll spring produces a tensile force at its free end, unrolled from the roll.

The movement of the slide member, holder and support is preferably damped by means of damping elements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
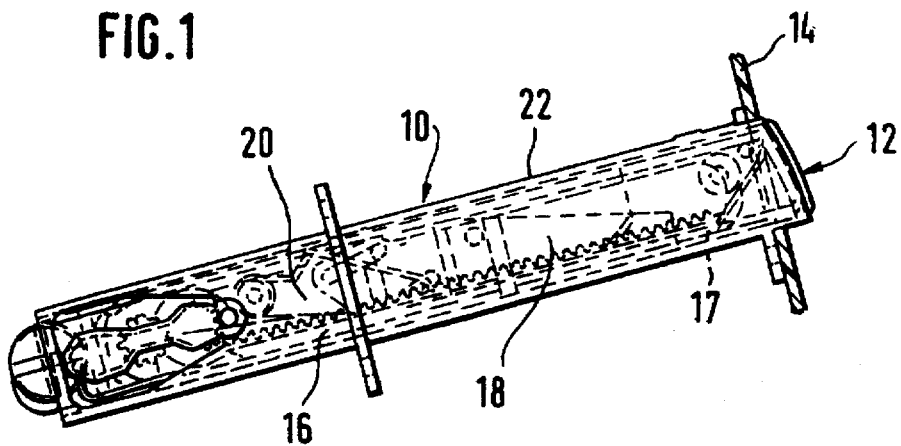
FIG. 1 is a side view of a holding device according to the invention in a closed basic position.

FIG. 1 shows the holding device 10 according to the invention in its basic position. With a cover piece 12, it closes flush with the fascia 14, which is only indicated, of a motor vehicle. Dashed lines indicate the position of a slide member 16, a holder 17, a support 18 and also a return member 20. These parts 16, 17, 18, 20 are housed, folded flat into one another, in a housing 22. The housing 22 forms a slide guide which guides the slide member 16 so as to be displaceable like a drawer. The housing 22 is mounted in an inclined position in the fascia 14, so that the slide member 16 is arranged to be moved out obliquely upwards into the position shown in FIG. 2, in which a drink container, for example a drink can, a beaker or a cup can be inserted into it.

Figure 2:
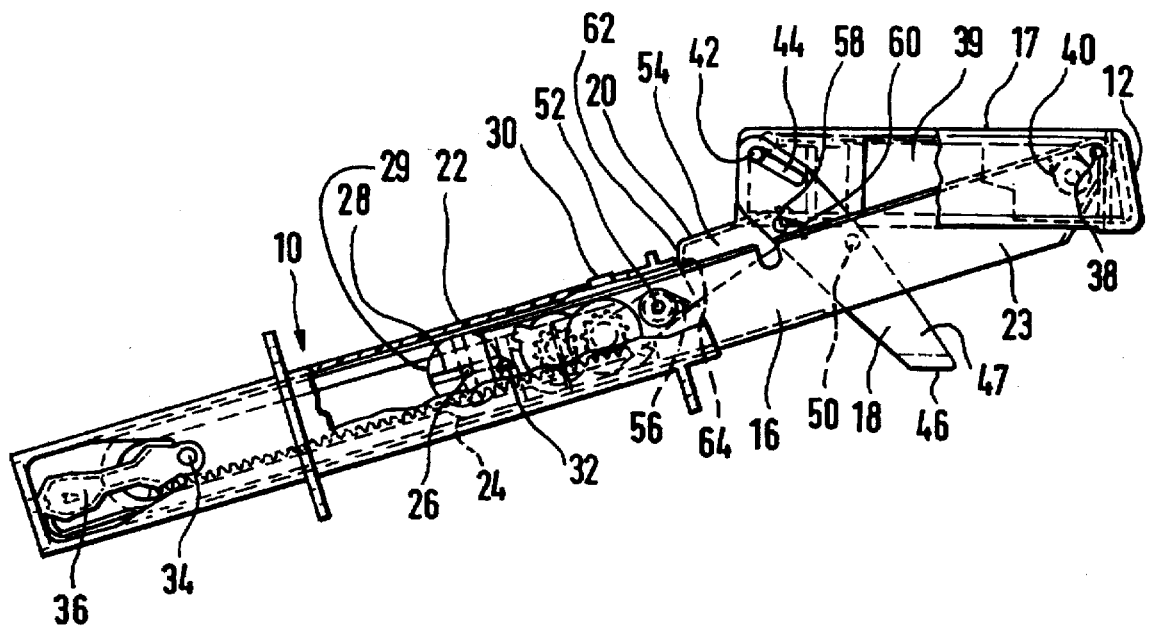
FIG. 2 is a sectional view of the holding device in FIG. 1 in an opened holding position.

FIG. 2 shows the housing 22 of the holding device 10 according to the invention cut away, so that the slide member 16 becomes visible. The slide member 16 is a flat part, and is somewhat wider than a drink container to be inserted into it. It has two lateral support arms 23, arranged like the tines of a fork, which project forwards out of the housing 22 when the slide member 16 is displaced into the holding position.

Figure 3:
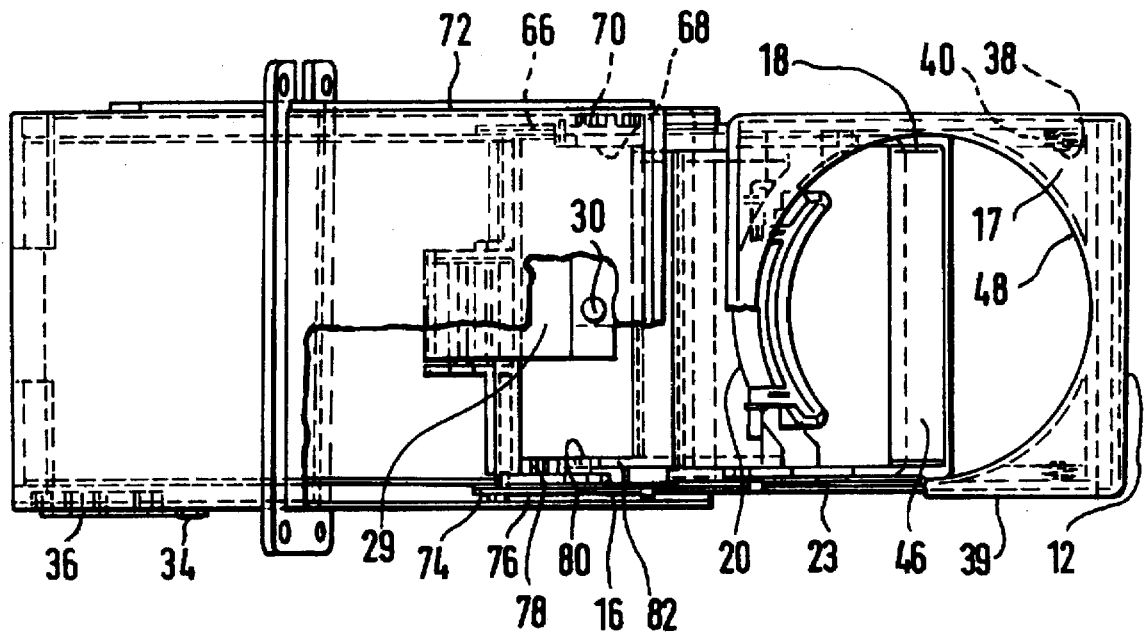
FIG. 3 is a plan view of the holding device according to FIG. 2.

In the forward region of the support arms 23 of the slide member 16, the holder 17 is mounted by means of two lateral pivot pins 38, which engage in bores in the support arms 23, so as to be pivotable upwards into a horizontal position. To pivot the holder 16, two torsion springs 40 are provided which are arranged adjacent to the pivot pins 38 (FIG. 3). The holder 17 has two side walls 39 which are located on the outer sides of the support arms 23. Mounted on the side walls 39 are the pivot pins 38. At the top, the side walls 39 are connected by means of a cover plate 41 having an insertion opening 48 for a drink container. The cover piece 12 is mounted transversely on the holder 17 at the front. The holder 17 is open to the rear and underneath.

In its rearward region, the holder 17 has two pins 42, arranged on its side walls 39 and projecting inward, each of which engages in a respective oblong hole 44 of the support 18. The support 18 is a U-shaped bracket, the transverse joining wall of which forms a setting-down surface 46 for a drink container to be inserted into the holding device 10 according to the invention. Two shank walls 47 of the support 18 are arranged on the inner sides of the support arms 23 of the slide member 16. When the holding device 10 is opened, the setting-down surface 46 is located beneath the insertion opening 48 of the holder 16 (FIG. 3).

The support is pivotally mounted on the slide member 16 by two pivot pins 50, which are arranged on its shank walls 47 and which engage in bores in the support arms 23 of the slide member 16. When the holder 17 is pivotable upward, the support 18, which is linked with the holder 17 by way of the oblong holes 44 and the pins 42 engaging therein, pivots downward with the setting-down surface 46.

The return member 20 is pivotally mounted by two lateral pivot pins 52 in bores of the slide member 16. It has two lateral arms 54 which, in the holding position of the slide member 16, project out of the housing 22 and which are pushed upward by a torsion spring 56. The arms 54 of the return member 20 each have a control pin 58 which engages in a control cam 60 of the support 17. The control cam 60 is in the form of a short, angled oblong hole. Its end portion, in which the pins 58 of the return member 20 are located when the holder 17 is in the horizontal position, extends approximately tangentially to the pivot pins 52, about which the return member 20 is pivotable. By this means, locking of the holder 17 is achieved by way of the support 18 linked to it: a pivoting movement of the holder 17 and of the support 18 by means of a force acting on one of these two parts 17, 18 is prevented by means of the end portion, extending tangentially to an arc-shaped pivot path of the control pins 58 of the return member 20 about its pivot pins 52, of the control cam 60 in which the control pins 58 engage. A force on the holder 17 or the support 18, which causes a moment at one of these two parts, produces a transverse force of the control pins 58 of the return member 20 on the end portion of the control cam 60 of the support 18 and prevents pivoting of the support 18, and of the holder 17 linked with it, from its horizontal position. The holder 17 and the support 18 can be folded into the position shown in FIG. 1, in which both these parts 17, 18 are located in one plane with the slide member 16, only by pushing down the return member 20.

The return member 20 is pushed down when the slide member 16 is pushed into the housing 22, by pressure on the cover piece 1 from the front. A return surface 62 at the upper edge of the return member 20 comes to bear against a forward upper edge of the housing 22, which forms a complementary surface 64 for the return surface 62. When the slide member 16 is pushed in, the return surface 62 slides along on the complementary surface 64, so that the return member 20 is pushed down. The return member 20 pivots the support 18 by means of its control pins 58, which engage in the control cam 60 of the support 18. By way of the support 18, in the oblong holes 44 of which the pins 42 of the holder 17 engage, the holder 17 is pivoted into the folded-in position, so that the holder 17, the support 18 and the return member 20 lie flat in one plane with the slide member 16.

When the slide member 16 is pushed completely into the housing 22, the slide member engages in a locking means. The slide member 16 has in its rearward region a laterally protruding triangular locking pin 32 which, when the slide member 16 is pushed into the housing 22, comes into engagement in a manner which is known per se with a heart-shaped curve 36 pivotable about a pin 34. By pressing the slide member 16 in at its cover piece 12, the locking pin 32 is liberated and the slide member 16 is pushed by a scroll spring 29 into the holding position, in which it projects out of the housing 22.

To open the holding device 10 according to the invention, the slide member 16 has at its rear side a retaining means 24, on the axis 26 of which a roll 28 of a scroll spring 29 is rotatably held. A free, unrolled end of the scroll spring 29 is thermoplastically riveted 30 to the housing 22. The scroll spring 29 pulls the slide member 16 out of the housing 22 into the holding position.

To damp the displacement movement of the slide member 16, the latter has a fluid rotation damper 68 which is inserted non-rotatably in one of its side walls 66 and the gearwheel 70 of which meshes with a toothed rack 72 integrally molded on the housing 22 (FIG. 3).

To damp the pivoting movement of the holder 17, the support 18 and the return member 20, a rotation damper 76 is provided which is inserted non-rotatably in an opposed side wall 74 of the slide member 16 and the gearwheel 78 of which meshes with a toothed segment 80 which is mounted on an arm 82, protruding into the inside of the housing 22, of the return member 20 (FIG. 3).

Figure 4:
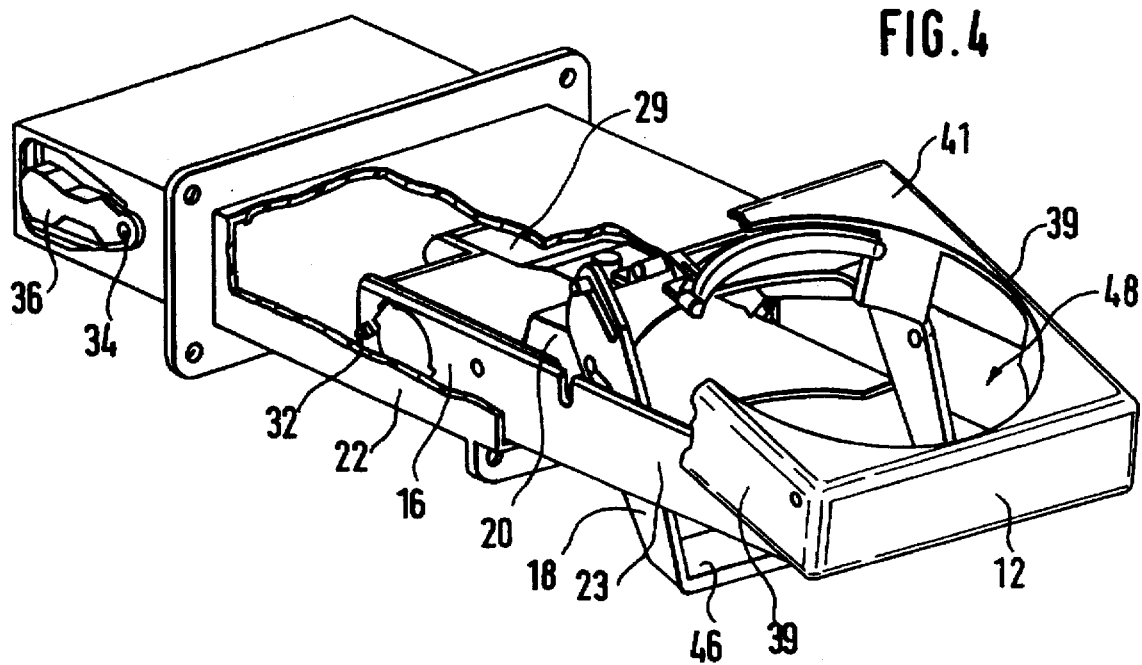
FIG. 4 is a perspective view, partly cut away, of the holding device according to FIG. 2.

In FIG. 4, the holding device 10 according to the invention is shown viewed obliquely from above in order to show clearly its mechanical construction, with cut-away portions to allow details to be viewed.

It will be understood that each of the elements described above, or two or more together, may also find a useful application in other types of constructions differing from the types described above.

While the invention has been illustrated and described as embodied in a holding device for drink container, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A holding device for a drink container, comprising a slide guide extending obliquely to a horizontal; a slide member which is guided so as to be displaced in said slide guide obliquely to the horizontal from a basic position in which it is pushed in into an extended holding position; a holder provided with an insertion opening for insertion of a drink container and pivotally mounted on said slide member so that when said slide member is displaced from the basic position into the holding position, said holder pivots out of an initial position substantially parallel to said slide member into a horizontal position; and a support having a setting-down surface for a drink container, said support being pivotally mounted on said slide member and linked with said holder so that when said holder is pivoted into the horizontal position, said support pivots with the setting-down surface downward beneath said insertion opening of said holder.

2. A holding device as defined in claim 1; and further comprising a return member which is pivotally mounted on said slide member and linked with at least one of said holder and said support so that when said slide member is pushed into the basic position said return member slides with a return surface along a fixed complementary surface and thereby pivots so as to pivot said holder back in an initial position.

3. A holding device as defined in claim 2; and further comprising a control cam provided on one of said holder and said support and having an end portion, said return member engaging in said end portion of said control cam, when said holder is horizontal, extending in a horizontal position of said holder substantially parallel to a pivot path of said return member.

4. A holding device as defined in claim 2; and further comprising a control cam provided on one of said holder and said support and having an end portion, said return member engaging in said end portion of said control cam, when said holder is horizontal, extending in a horizontal position of said holder outward away from a pivot path to an end stop.

5. A holding device as defined in claim 1; and further comprising a spring, wherein at least one of said holder and said return member pivots into the holding position on displacement of said slide member actuated by said spring.

6. A holding device as defined in claim 1; and further comprising a spring, wherein said holder and said return member pivots into the holding position on displacement of said slide member actuated by said spring.

7. A holding device as defined in claim 1; and further comprising a locking means, which locks said slide member in the basic position, said slide member being provided with a spring which engages in a fixed position and which displaces said slide member into the holding position after it has been unlocked.

8. A holding device as defined in claim 1; and further comprising a damping element which damps the displacement movement of said slide member.

9. A holding device as defined in claim 1; and further comprising a damping element, which damps the pivoting movement of said holder.

10. A holding device for a drink container, comprising a slide guide extending obliquely to a horizontal; a slide member which is guided so as to be displaced in said slide guide from a basic position in which it is pushed in into an extended holding position; a holder provided with an insertion opening for insertion of a drink container and pivotally mounted on said slide member so that when said slide member is displaced from the basic position into the holding position, said holder pivots out of an initial position substantially parallel to said slide member into a horizontal position; a support having a setting-down surface for a drink container, said support being pivotally mounted on said slide member and linked with said holder so that when said holder is pivoted into the horizontal position, said support pivots with the setting-down surface downward beneath said insertion opening of said holder; and locking means, which locks said slide member in the basic position, said slide member being provided with a spring which engages in a fixed position and which displaces said slide member into the holding position after it has been unlocked, said spring being a scroll spring.

* * * * *